VERTICAL CAN PRINTER MACHINE

INVENTORS
LEWIS C. PRICE, JR.
BY THOMAS J. BENICHASA
Kenyon & Kenyon
ATTORNEYS

INVENTORS
LEWIS C. PRICE, JR.
THOMAS J. BENJCHASA
BY Kenyon & Kenyon
ATTORNEYS

INVENTORS
LEWIS C. PRICE, JR
BY THOMAS J. BENICHASA
Kenyon & Kenyon
ATTORNEYS

INVENTORS
LEWIS C PRICE, JR.
BY THOMAS J. BENICHASA
Kenyon & Kenyon
ATTORNEYS

INVENTORS
LEWIS C. PRICE, JR.
BY THOMAS J. BENICHASA
Kenyon & Kenyon
ATTORNEYS

INVENTORS
LEWIS C. PRICE, JR.
THOMAS J. BENICHASA
BY Kenyon & Kenyon
ATTORNEY

Oct. 15, 1968 L. C. PRICE, JR., ET AL 3,405,633

VERTICAL CAN PRINTER MACHINE

Filed Oct. 28, 1966 7 Sheets-Sheet 7

INVENTORS
LEWIS C. PRICE, JR.
THOMAS J. BENICHASA
BY Kenyon & Kenyon
ATTORNEYS 3,405,633
VERTICAL CAN PRINTER MACHINE
Lewis C. Price, Jr. and Thomas J. Benichasa, Yonkers, N.Y., assignors to Control Print Corporation, North Arlington, N.J., a corporation of New Jersey
Filed Oct. 28, 1966, Ser. No. 590,239
6 Claims. (Cl. 101—37)

ABSTRACT OF THE DISCLOSURE

A machine for imprinting material on a certain section of a container is disclosed. The machine includes a conveyor mechanism which conveys the containers through the machine imprinting means. Astride the conveyor are positioning means which can sense a mark on the container and rotate the container to a predetermined position, so material can be imprinted on the proper surface portion of the container. The positioning means include a rotating wheel and a photoelectric scanner, the former pushes the container into abutting relation with the rotating wheel to rotate the container to the proper position.

The invention relates to a vertical can printer machine. More particularly, the invention relates to a vertical can printer machine for imprinting rounded cans at predetermined areas on the cans. Still more particularly, the invention relates to a vertical can printer machine which orientates each can of a series of random-fed rounded cans to a predetermined position and which prints each can in the same predetermined area on the can surface.

Heretofore, printing machines have been known for imprinting certain of the surfaces of conveyed packages. Such printing machines have generally been used for printing flat-sided packages or packages of any shape which were fed and conveyed in a particular pre-set manner to the printing mechanisms. In several of these printing machines, detection devices have been used which project across the path of movement of the conveyed packages to detect the leading edge of each package so as to program the printing mechanisms to imprint the surfaces of the packages with respect to the leading edges of each. However, these previously known printing machines have not been satisfactory for imprinting the surfaces of random-fed packages, especially rounded cans, at a precise predetermined area of the package surfaces. Further, in those instances where packages have been pre-labeled or pre-printed and another imprint is desired on the package, the previously known printing machines have not always been reliable in imprinting the additional imprint on the package at the desired area.

In addition, where it has been necessary to use a vertical type printing means, for example, in the printing of the outer or vertical side walls of a package, such as paint cans, aerosol containers, etc., a satisfactorily uniform distribution of ink on the vertically disposed type surface has not been easily and repeatedly achieved.

The present invention is directed to the imprinting of labels, names or other marks on the containers or wrappers of packaged goods, especially goods which are packaged in rounded smooth-surfaced cans or containers. The printing machine of the invention is adapted to convey a series of random-fed cans in a path in which each can is orientated into the same predetermined position and delivered to a vertical can printer for imprinting at the same predetermined area.

Briefly, the machine of the invention includes a conveyor for conveying a series of random-fed cans, each of which is coded with a registration mark at a predetermined location relative to the desired area for imprinting in a path while individually holding each can on the conveyor in a fixed position with a holding means which is adjustable to different sized cans. The conveyor conveys each can through an orientating means which rotates each can until the registration mark is brought into a predetermined position and through a printing means which imprints each of the orientated cans at a predetermined area on the sidewall. After printing, the conveyor conveys each can out of the printing means for subsequent operations, such as a packing operation.

Accordingly, it is an object of the invention to provide a machine for vertically imprinting rounded cans.

It is another object of the invention to produce high quality imprints in predetermined areas around the circumference of any round smooth-surfaced container.

It is another object of the invention to imprint each can of a random-fed series of cans at the same predetermined area.

It is another object of the invention to imprint rounded cans in predetermined areas of previously applied printed labels.

It is another object of the invention to provide a vertical can printer for imprinting different sized rounded cans.

It is another object of the invention to imprint a series of rounded cans at a high rate of output.

It is another object of the invention to provide a high speed vertical can printer machine which accurately imprints each can of a conveyed series of rounded cans at predetermined areas on the cans.

These and other objects and advantages of the invention will become more apparent from the following detailed description and appended claims taken in conjunction with the accompanying drawings in which:

Figure 1:
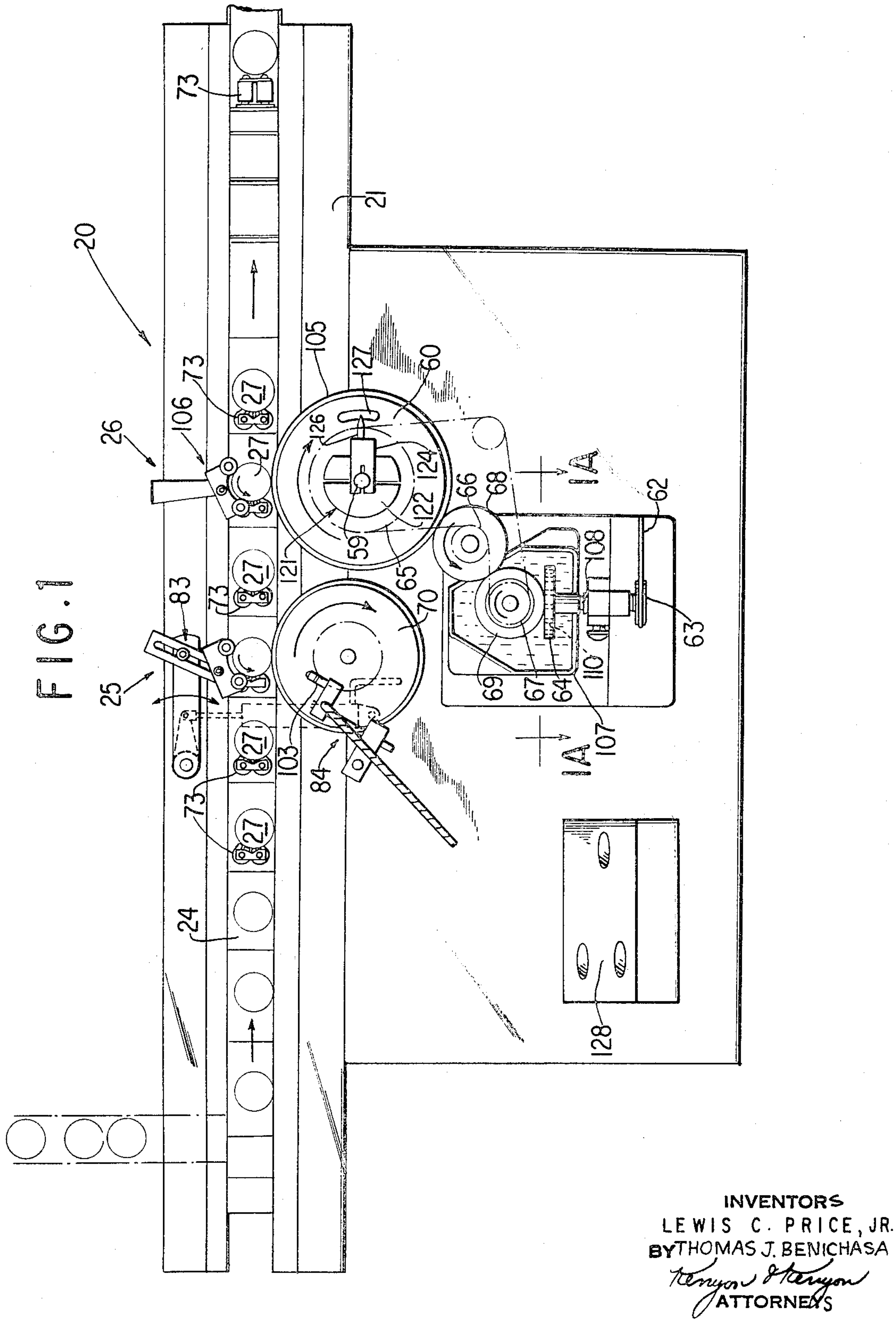
FIG. 1 illustrates a plan view of the vertical can printer machine of the invention.
Figure 2:
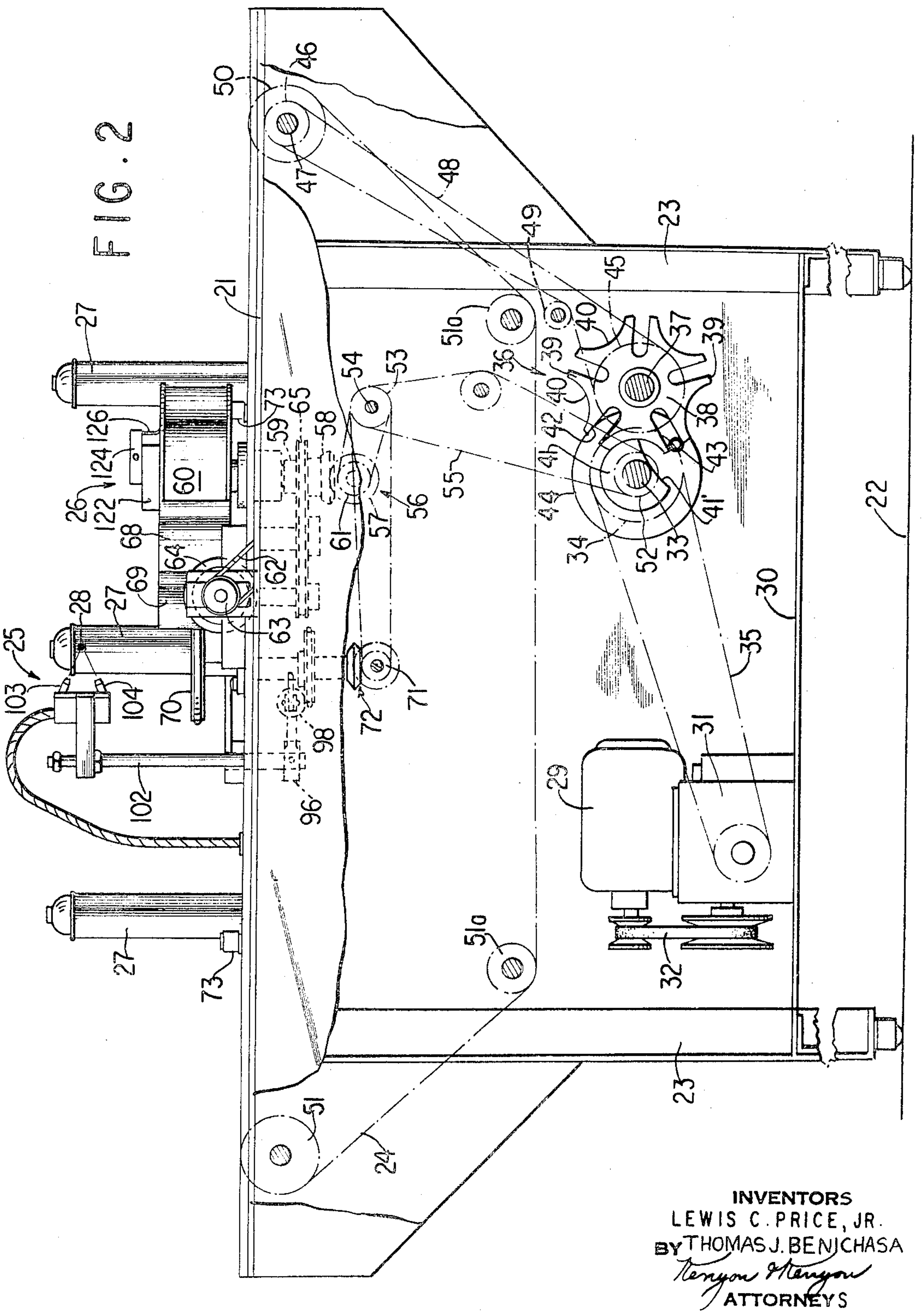
FIG. 2 illustrates a broken side view of the vertical can printer machine of FIG. 1.

Referring to FIGS. 1 and 2, the machine 20 includes a base 21 which is mounted on a floor 22 by a plurality of legs 23 which can be vertically adjusted to raise or lower the base 21 into a horizontal plane, if necessary. A conveyor 24 is mounted on the machine 20 to convey a series of packages, such as rounded cans, along the base 21 on a straight path. The conveyor 24 passes through an orientating means 25 and a printing means 26 which are positioned on the base 21 astride the conveyor path. The orientating means 25 is adapted to detect the presence of a can on the conveyor 24 having a code mark on an exposed surface and to pre-position the detected can by rotation into a predetermined position. Thereafter, the prepositioned can is delivered to the printing means 26 by the conveyor 24 while being maintained in the predetermined position. The printing means 26 then imprints the can at a predetermined area relative to the position of the can and the code mark. The conveyor means 24 then delivers the printed can along the remainder of the conveyor path for suitable subsequent operations.

Figure 3:
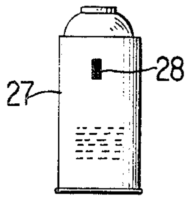
FIG. 3 illustrates a rounded can utilized by the machine of the invention with a code mark.

Referring to FIG. 3, a can 27 upon which the machine 20 operates is generally of a rounded smooth-surfaced shape and is provided with an exposed registration mark 28 on a vertical surface which is related to an area of the can to be printed; the can 27 being prelabeled or not, as desired.

Referring to FIG. 2, the machine 20 is powered by a motor 29 mounted below the base 21 on a suitable support 30. The motor 29 drives a variable speed drive means 31 through a conventional belt arrangement 32 and the drive means 31 actuates a drive shaft 33 through a sprocket 34 fixed to the drive shaft and a belt or chain 35. The drive shaft 33 drives the conveyor means 24 through a stop indexing mechanism 36, such as a Geneva motion, as well as the printing means 26.

The stop indexing mechanism 36 includes a rotatable shaft 37 mounted in the machine adjacent the drive shaft 33, and an index wheel 38 fastened on the shaft 37. The index wheel 38 is formed with a series of radiating fingers 39 having concave arcuate faces 40 for sequentially engaging a circular segmented cam 41 fastened on the drive shaft 33 and a series of radial slots 42 formed between the fingers 39 for sequentially containing a pin 43 secured on a circular cam 41 fastened on the drive shaft 33. The segmented cam 41 has a notch 41' which is sized to permit rotation of the index wheel 38 when the pin is received in one of the slots 42 of the index wheel 38 upon rotation of the drive shaft 33. In addition, the stop indexing mechanism 36 includes a sprocket 45 mounted on the shaft 37 which drives a sprocket 46 secured to a rotatable conveyor drive shaft 47 through a pulley chain 48 which is suitably tensioned as by a tensioning sprocket 49. The conveyor drive shaft 47 which is mounted at one end of the machine 20 rotates a conveyor chain sprocket 50 mounted thereon which drives the conveyor 24 over a conveyor idler sprocket 51 mounted at the other end of the machine 20 as well as a pair of guide and tensioning rollers **51*a* suitably mounted in the machine 20**.

The stop indexing mechanism 36 allows the conveyor chain 24 to be moved in an intermittent manner during continuous operation of the motor 29 and drive shaft 33 of the machine 20 so that the travel of a conveyed can may be stopped in order to orientate and print conveyed cans.

Referring to FIGS. 1 and 2, the drive shaft 33 also drives the printing means 26 through a drive arrangement having a sprocket 52 (FIG. 2) fastened thereon which drives a sprocket 53 mounted on a shaft 54 through a chain 55. The shaft 54, in turn, drives a sprocket assembly 56 which includes a bevel gear 57 in engagement with a bevel gear 58 on the end of a drive shaft 59 of a print cylinder 60, and a pulley wheel 61 in driving engagement through a belt 62 with a pulley wheel 63 of a rotary pump wheel 64. The print cylinder drive shaft 59 is provided with a sprocket 65 (FIG. 1) which drives similar sprockets 66, 67, respective shafts of a metering roller 68 and ink transfer roller 69.

In a similar manner, the drive shaft 33 also drives a rotatable wheel 70 of the orientating means 25 through a drive arrangement having a pulley 71 driven from shaft 54 and a bevel gear arrangement 72 driving the pulley 70 in syncchronism with the print cylinder 60.

Figures 1A, 7, 8, 9:
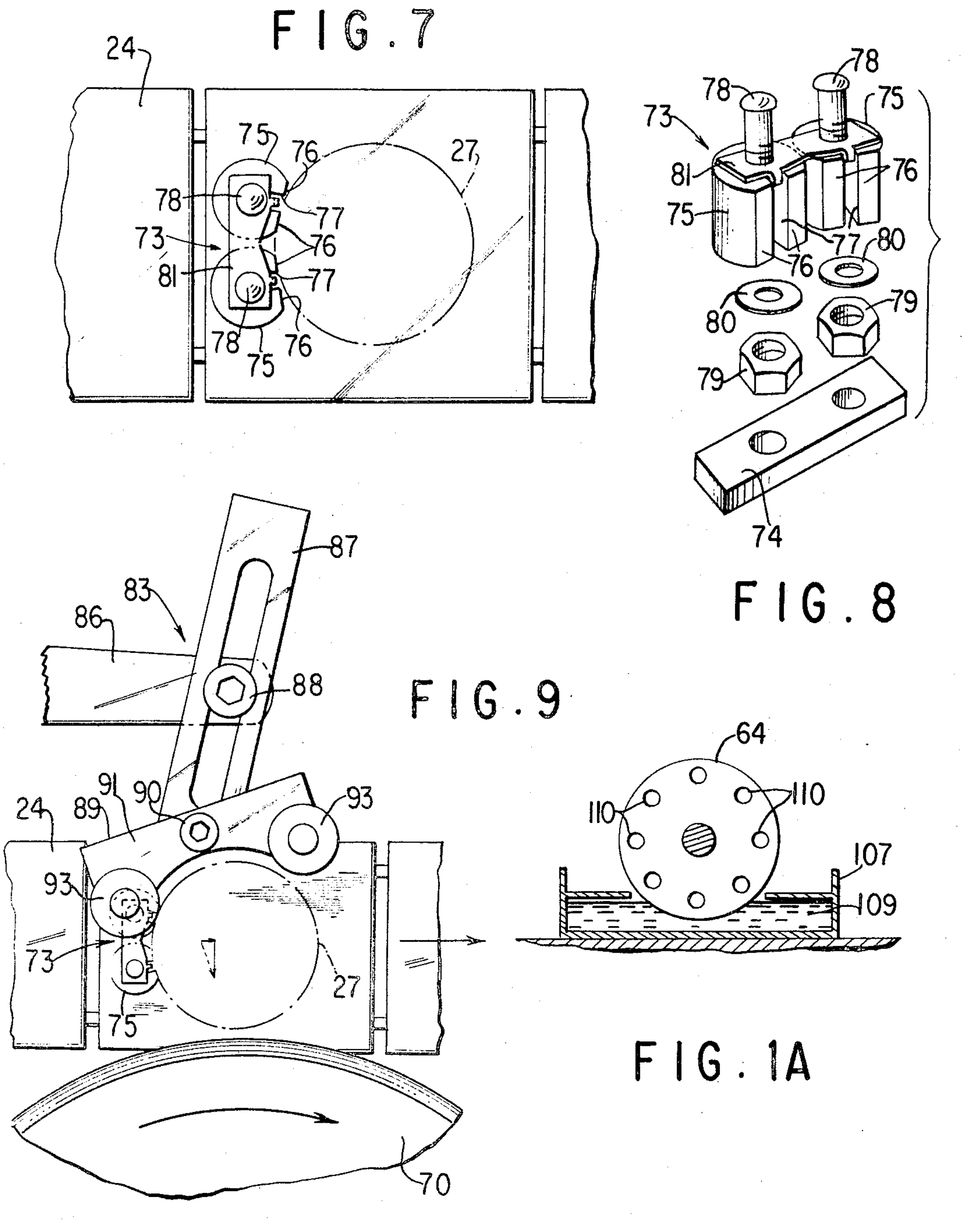
FIG. 1A illustrates a view taken on line 1A—1A of FIG. 1.
FIG. 7 illustrates a plan view of the adjustable magnetic holding means for holding the rounded cans on the conveyor.
FIG. 8 illustrates an exploded view of the magnetic holding means.
FIG. 9 illustrates a plan view of a rounded can in a position at commencement of the orientation operation.

Referring to FIGS. 1, 7 and 8, the conveyor 24, formed, for example, by an endless chain, is provided with a series of sequentially equally spaced holding means 73 for maintaining the series of cans on the conveyor 24 during movement of the cans along the machine 20. Each holding means (FIG. 7) is mounted on the conveyor at a position behind a can 27 with respect to the direction of can travel so as to in effect push against the can. Each holding means (FIG. 8) includes a base plate 74 secured to the conveyor 24, as by bolts, and a pair of pivotally mounted permanent magnets 75 having can engaging faces 76 for magnetically holding a metallic can 27 thereon. Each magnet 75 is formed with a key-hole shaped bore 77 communicating with the exterior of the magnet between the faces 76. A headed screw 78 passes through the bore 77 of the magnet 75 into threaded engagement with the base plate 74 and a stop nut 79 is threaded on the screw 78 between the plate 74 and magnet 75 to secure the magnets on the plate. In addition, a bearing plate 80 of suitable material such as nylon, is placed on the screw 78 between the stop nut 79 and magnet 75. A limit plate 81 through which the screws 78 pass, is positioned across the top surfaces of the magnets 75 and has a pair of detents 82 each of which projects into a key-hole bore 77 between the faces 76 to act as a stop for limiting the pivoting of the magnets 75 with respect to each other and the base plate 74. The magnets 75 are thus adjustable to engage the side walls of different sized cans 27. For example, the magnets 75 may hold any metal can of a diameter from 2 to 7 inches. For a larger size pair of magnets (not shown) the cans may range from 3⅜ to 7 inches in diameter.

Figure 5:
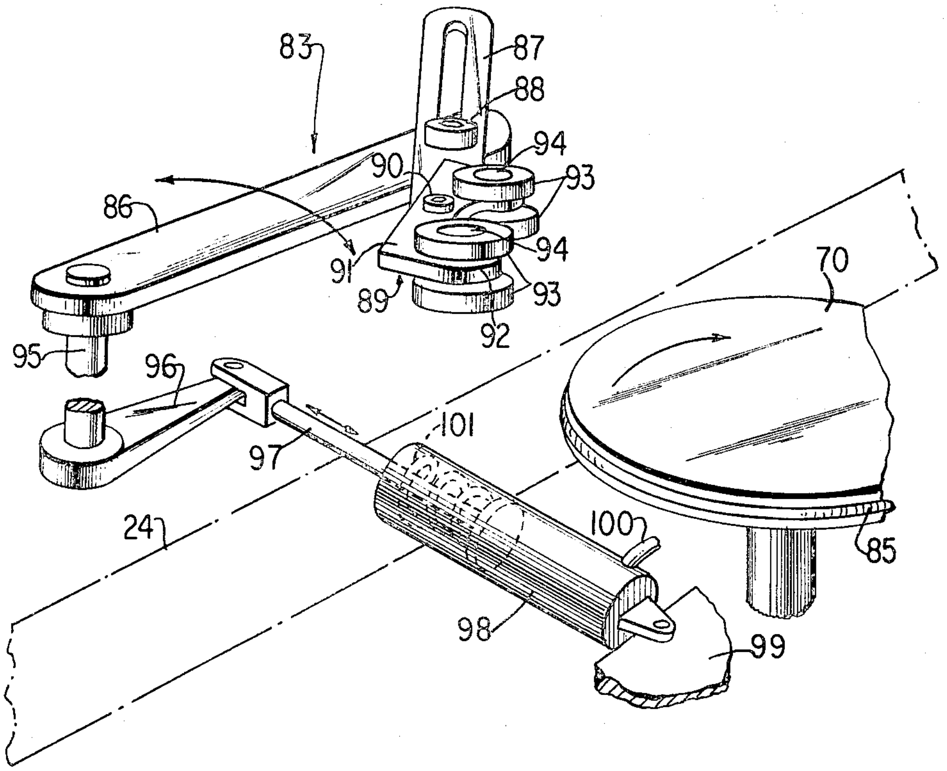
FIG. 5 illustrates a perspective view of the back-up mechanism of the orientating means of the invention.
Figure 6:
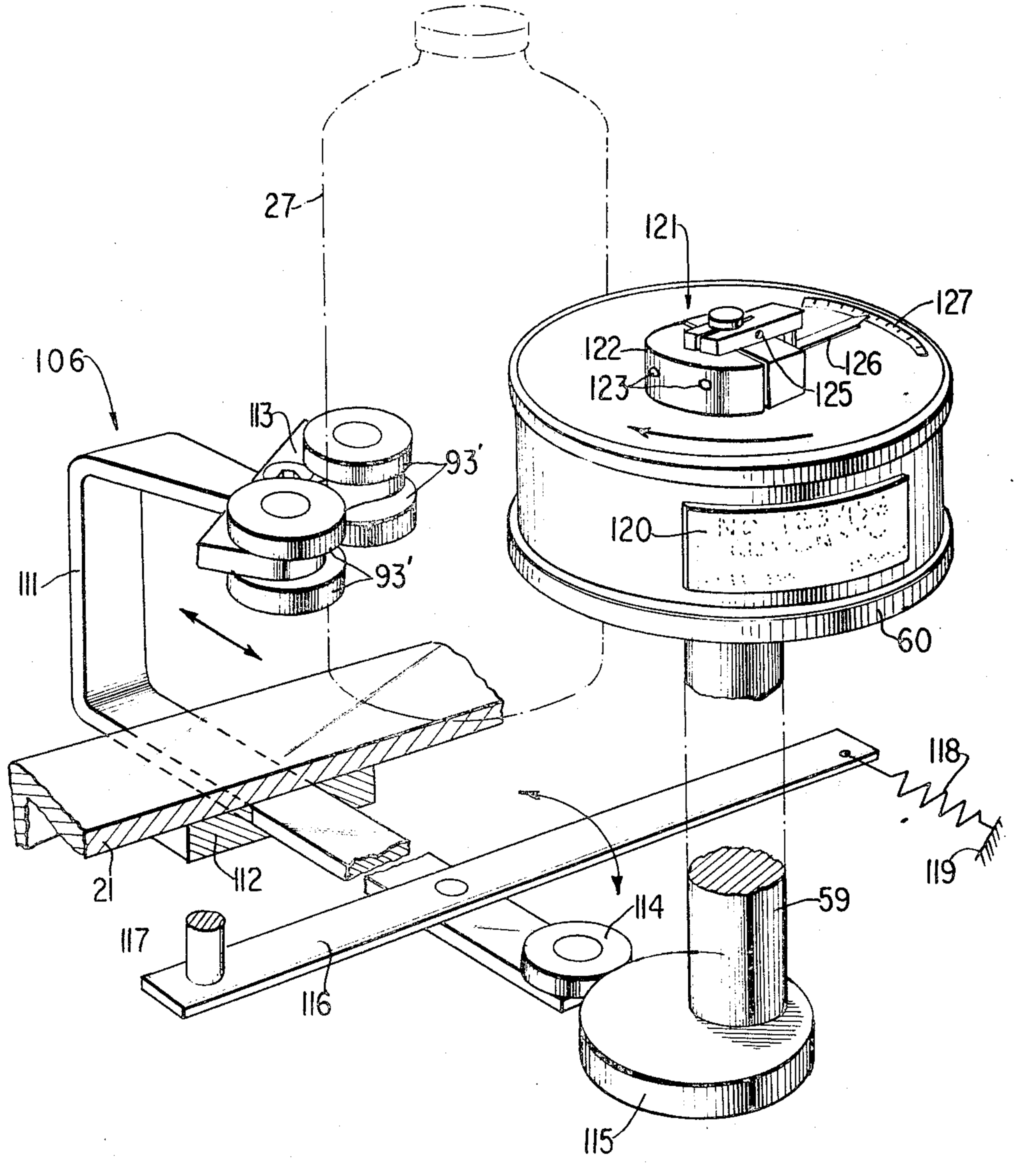
FIG. 6 illustrates a perspective view of the back-up mechanism of the printing means of the invention.

Referring to FIGS. 1 and 5, the orientating means 25 is positioned astride the conveyor 24 and includes a rotatable wheel 70, a back-up cradle 83 and a photoelectric scanner device 84. The rotatable wheel 70 has a friction peripheral surface formed, for example, by an annular rubber ring 85 which projects into the conveyor path adjacent to the projected path of the cans 27 (FIG. 1). The back-up cradle 83 (FIG. 5) is mounted on the opposite side of the conveyor 24 from the rotating wheel 70 and includes an arm 86, a slotted arm 87 mounted on the arm 86 as by a screw 88 for adjustment in a horizontal plane above the conveyor 24, and a cradle 89 secured on the end of the slotted arm 87 as by a screw 90. The cradle 89 includes a generally C-shaped mounting plate 91 and a pair of roller units 92 mounted in the ends of the plate 91. Each roller unit 92 has a pair of vertically spaced smooth-surfaced rollers 93 rotatably mounted on a shaft 94 for frictionally engaging the side wall surface of a can 27.

The back-up cradle 83 (FIG. 5) is secured on a pivotally mounted pin 95 passing through the base 21 of the machine 20. The pin 95 has a lever 96 secured at one end under the base 21 which is pivotally fixed to a reciprocally mounted piston 97 of an air cylinder 98. The air cylinder 98 is mounted on a frame 99 of the machine on the side of the conveyor 24 opposite the back-up cradle 83 and is pneumatically actuated through a line 100 by a solenoid (not shown). In addition, the air cylinder 98 houses a return spring 101 for moving the piston 97 out of the air cylinder 98 so as to move the cradle 89 towards the rotating wheel 70.

Referring to FIGS. 1 and 2, the scanner device 84 includes a light source 103 and a photoelectric cell 104 for receiving light from the light source which is reflected from a can 27 positioned between the rotating wheel 70 and cradle 89. The scanner device 84 is mounted for vertical as well as horizontal adjustment on a mounting bracket 102 secured to the base 21 over the rotating wheel 70. The scanner device 84, for example, consists of a Model A–24B Amplifier and Model PL–7 Reflex Scanner which is sold by Eastern Automation Inc.

Referring to FIGS. 1, 1A, 2 and 6, the printing means 26 includes a printing mechanism 105 mounted on one side of the conveyor 24 and a back-up cradle 106 mounted on the opposite side of the conveyor from the printing mechanism 105.

The printing mechanism 105 includes the rotatable print cylinder 60 which is horizontally disposed to project over the conveyor 24 adjacent the path of the cans 27, the metering roller 68, also horizontally disposed which meters ink to the printing surfaces of the print cylinder 60, the horizontally disposed ink transfer roller 69 which transfers ink to the metering roller 68 from the pump wheel 64, and an ink fountain 107 into which the pump wheel 64 projects. The rotary pump wheel 64 (FIG. 1A) is vertically mounted on the shaft 108 of the pulley wheel 63 to project into a supply of ink 109 in the fountain 107 at a lower portion. The pump wheel 64 is formed with a plurality of horizontally disposed circumferentially equi-spaced recesses 110 which become submerged in the ink 109 upon rotation of the pump wheel 64 to pick-up ink for transfer to the ink transfer roller 68.

The back-up cradle 106 (FIG. 6) includes a bracket 111 which is slidably mounted in a guide passage of a guide 112 secured to the underside of the base 21, and a cradle 113 similar to the cradle 89 of the orientating means 25 which is likewise described by prime reference characters. The cradle 113 is disposed on the opposite side of the conveyor 24 from the print cylinder 60 to position a can 27 therebetween for printing. The bracket 111 has a cam follower 114 mounted on one end below the base 21 for abutment against a cam 115 eccentrically secured on the shaft 59 of the print cylinder 60. A lever 116 which is pivotally mounted at one end by a pin 117 secured to a frame (not shown) of the machine 20 is fixed to the bracket 111. In addition, the free end of the lever 116 is secured to a spring 118 fastened to a frame 119 of the machine 20 which urges the lever towards the print cylinder shaft 59 so that the cam follower 114 is in constant contact with the cam 115. Thus, as the shaft 59 rotates, the bracket 111 and cradle 113 reciprocate in a horizontal plane with respect to the print cylinder 60.

The print cylinder 60 is provided with brass back or steel back dies 120 (FIG. 6) which are secured thereto as by removable screws (not shown) as in a snap-fit relation for imprinting the cans 27 when positioned between the cradle 113 and print cylinder 60. The print head of the cylinder 60 may carry multiple units for simultaneous imprinting of product identification, contents and ingredient information, and allows quick copy changes while adapting readily to varying can sizes. In addition, the print cylinder 60 is provided with an adjusting mechanism 121 to orientate the printing plate dies 120 for assuring prepositioned printing. The adjusting mechanism 121 includes a split collar 122 which fits over an extension of the print cylinder shaft 59 and has segments fastened together as by bolts 123 to secure the print cylinder 60 to the shaft 59, and a split indicator block 124 which is positioned atop the collar 122 and secured to the shaft 59 extension as by a locking screw 125. The split indicator block 124 has an indicator needle 126 extending over a dial scale 127 positioned in an aperture of the top surface of the print cylinder 60 for indicating the position of the printing plate dies 120 with respect to the conveyor can positions. Thus, upon loosening of the indicator block and split collar, the print cylinder 60 can be rotated to the desired position for printing purposes and subsequently locked in position by tightening of the split collar.

Figure 4:
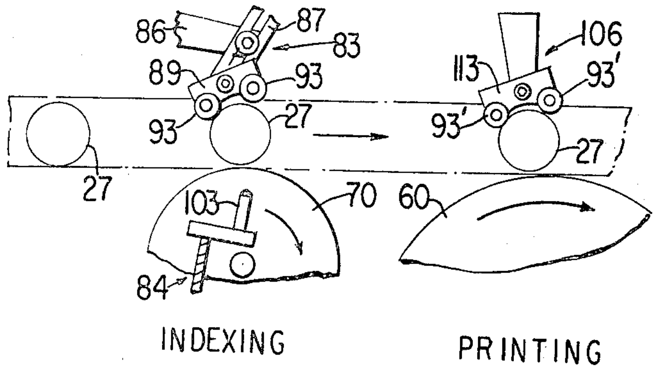
FIG. 4 illustrates a fragmentary plan view of the orientating means and printing means astride the conveyor of the machine of the invention.

In operation, referring to FIGS. 1, 4, 5, 6 and 9, with the rotating wheel 70 and print cylinder 60 continuously rotating, the conveyor 24 having a series of smooth-surface rounded metallic cans 27 held thereon in equispaced relation by the individual magnetic holding means 73 intermittently conveys a foremost can by means of the stop indexing mechanism 36 to a position between the rotating wheel 70 and back-up cradle 83 of the orientating means 25. At the time the foremost can is brought into position, the back-up cradle is spaced at a retracted position from the rotating wheel 70 under the force of the air introduced through the line 100. While the conveyor 24 remains stationary, the back-up cradle 83 is actuated under the force of the spring 101 in the air cylinder 98 causing it to move towards the rotating wheel 70 (FIG. 9) and the foremost can 27 therebetween. The cradle 89 is positioned with respect to the can 27 so that the rollers 93 of the rearmost roller unit 93 first contact the can 27. The impact force of these rollers as well as the position at which the force is applied is sufficient to detach the can 27 from the magnets 75 of the holding means 73 and direct the can 27 between both roller units 93 against the rubber ring 85 on the periphery of the rotating wheel 70. Upon abutting the rotating wheel 70, the can 27 begins to rotate in a direction opposite the rotating wheel (FIG. 4).

At the time the back-up cradle 83 is actuated, the scanner device 84 is also actuated so that the circumferential area in which the registration mark is located is scanned. The registration mark 28 is made of a different color from the remainder of the can area scanned so that when the can is rotated into the proper position the mark will be interposed in the light path from the light source 103 to the photoelectric cell 104. Upon detection of the registration mark in the light path of the scanner device 84, the scanner device permits introduction of air into the air cylinder 98 through the line 100 to counteract the spring 101. The back-up cradle 83 is simultaneously pivoted away from the can 27 to stop rotation and the magnetic holding means 73 again engages the can 27. The can is thus in the desired preposition for subsequent printing.

After the foremost can is prepositioned, the conveyor 24 moves ahead in intermittent steps until the foremost can is positioned adjacent the print cylinder 60. While the can is in this position (FIG. 6), the back-up cradle 106 is brought into abutment with the can in a similar manner as the back-up cradle 83 in order to disengage the can from the magnetic holding means 73 and abut the can against the rotating print cylinder 60. Upon abutting the print cylinder 60 the can 27 begins to rotate. The printing plate dies 120 are thus brought into printing contact with the can surface to imprint the vertical side wall with the desired markings. Since the can has been prepositioned by the orientating means 25 and held in this position by the holding means 73 on the conveyor 24 and since the printing cylinder 60 is synchronized to this position, the printing plate dies 120 fixed on the printing cylinder 60 accurately imprint the can in the desired area.

The imprinting of the can is timed to be performed while both the can and printing cylinder are rotating. When the back-up cradle 106 is moved away from the can 27 under the influence of the eccentric cam 115 on the continuously rotating printing cylinder shaft 59, which is synchronized to the conveyor 24 movements, the can 27 stops rotating and is then moved away from the print cylinder for reengagement with the holding means 73 under the magnetic attraction of the magnets 75. The conveyor thereafter continues to move intermittently to convey the imprinted can out of the machine, for example, onto a ramp positioned at the end of the machine in alignment with the conveyor.

Subsequent cans in the series of random-fed cans are likewise orientated and printed so that each can is imprinted in the exact same location relative to the registration marks on each; the registration marks being in the same position on each can. As shown in FIG. 1, when one can of a series is being printed another can is being simultaneously orientated.

Figure 10:
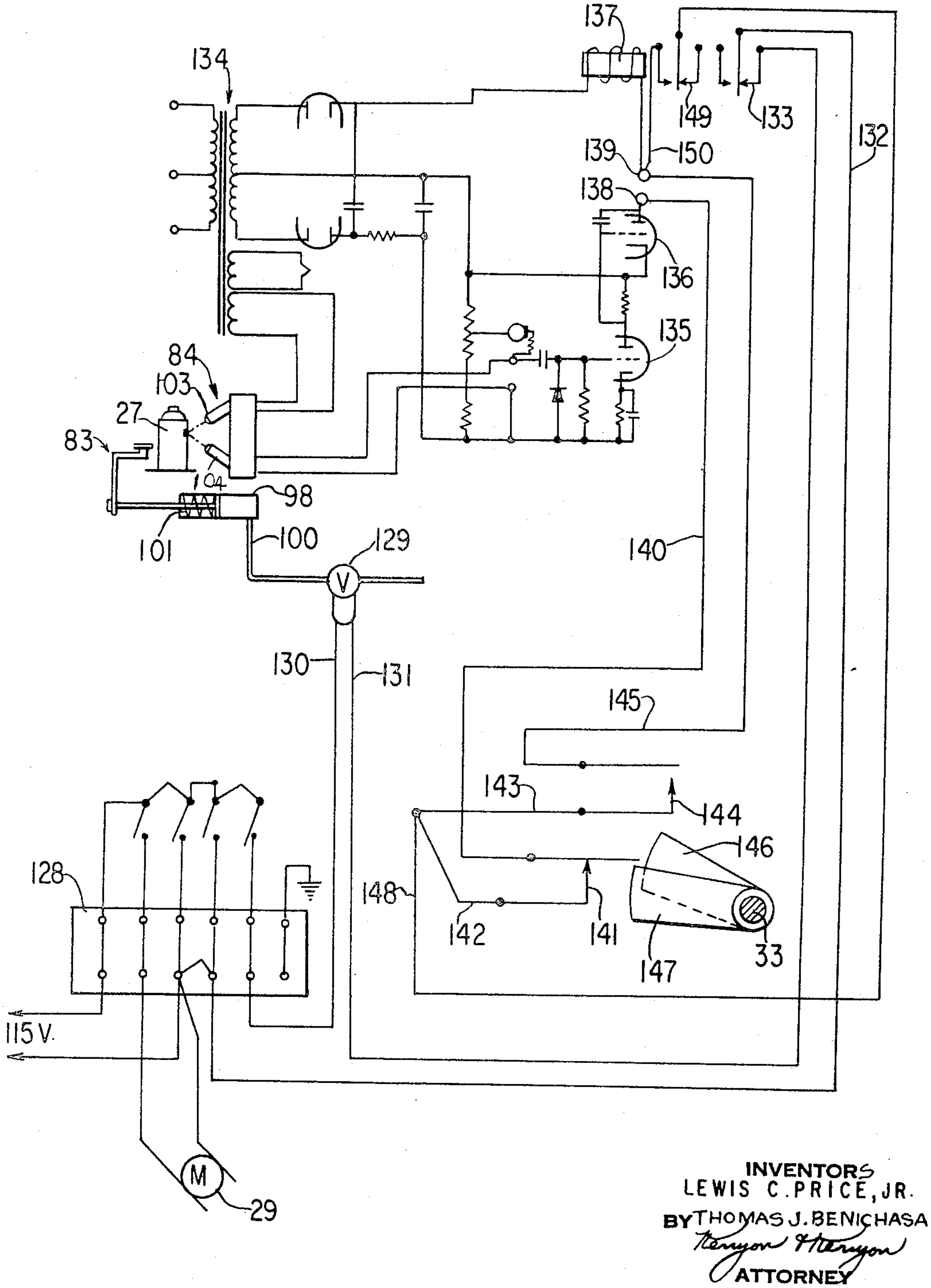
FIG. 10 illustrates a schematic electrical circuit for the machine of FIG. 1.

Referring to FIG. 10, in order to operate the machine electrically, a control box 128 is supplied with power from a source and the motor 29 is connected to the control box 128. Also, a solenoid valve 129 is connected into the control box 128 by a lead 130 and by leads 131, 132 which have a normally closed switch 133 therebetween. The solenoid valve 129 is operatively connected in the air line 100 of the air cylinder 98 and connected to an air supply in a normally energized or open state to continuously conduct air into the air cylinder in opposition to the spring 101.

Additionally, the scanner device 84 is provided with a circuit 134 having a power tube 135 for producing a signal in response to a pulse from the photocell 104, an amplifier tube for amplifying the produced signal from the power tube 135 and an amplifier relay 137 which is energized upon closing of contacts 138, 139. Contact 138 is connected by a lead 140 to a switch 141, such as a microswitch, which is normally closed and by leads 142, 143 to a switch 144, such as a microswitch, which is normally open and in series with switch 141. The switch 144 is connected by a lead 145 to contact 139.

The electrical circuit is actuated through a pair of cams 146, 147 mounted on the drive shaft 33 of the machine which are synchronized to the conveyor with respect to the can positions. In addition, the switch 141 is also connected by lead 142, 148 to a normally opened holding switch 149 connected by a lead 150 to contact 139.

In operation, when a can 27 becomes indexed between the rotating wheel 70 and back-up cradle 83 of the orientating means, the cam 146 on the drive shaft momentarily moves the switch 144 into a closed position. This closes the amplifier circuit to the amplifier relay 137 and allows the pulse of the photoelectric cell 104 receiving reflected light from the can 27 to energize the amplifier relay 137.

Upon energization, the amplifier relay 137 closes the switch 149 so that the scanner device 84 remains energized after the cam actuated switch 144 opens after passage of the cam 146. Also, the amplifier relay 137 opens the switch 133 of the solenoid valve 129 so that the air supply is cut off from the air cylinder 98. Simultaneously, the spring 101 urges the back-up cradle 83 against the can 27 as described above for rotation.

Upon detection of the registration mark 28 on the can 27 by the photoelectric cell 104, the pulse of the photoelectric cell is interrupted so that the amplifier relay 137 becomes deenergized. This simultaneously causes the holding switch 149 to open thereby deactivating the scanner device 84 and causes the switch 133 to open to solenoid valve 129 to permit air into the line 100 of the air cylinder 98 thereby urging the back-up cradle 83 away from the can 27. The can 27 is then in the preposition desired and is ready for subsequent travel with the conveyor 24.

Should a can be missing from the series of random-fed cans, the cam 147 on the drive shaft 33 momentarily opens the switch 141 just prior to the indexing of the next can of the series. This retracts the cradle 83 to prevent jamming of the next can against it. Thus, should the amplifier relay 137 be in an energized state with the holding switch 149 closed, the opening of switch 144 causes the amplifier relay 137 to be de-energized and, consequently, opens the holding switch 149 and closes the solenoid valve switch 133. The scanner device 84 is then deenergized. Upon positioning of a subsequent can in the next movement of the conveyor in proper position, the switch 141 is again closed and the switch 144 is subsequently actuated as above.

The holding means on the conveyor 24 can be modified to be operated as an electromagnetic holding means or as a vacuum holding means, the latter being useful when the cans are made of non-magnetic material. For example, referring to FIGS. 11 to 14, a non-metallic can 27′ is conveyed on a conveyor 24′ having a plurality of vacuum actuated holding means 151, only one of which is shown (FIG. 11).

Figures 11, 12, 13, 14:
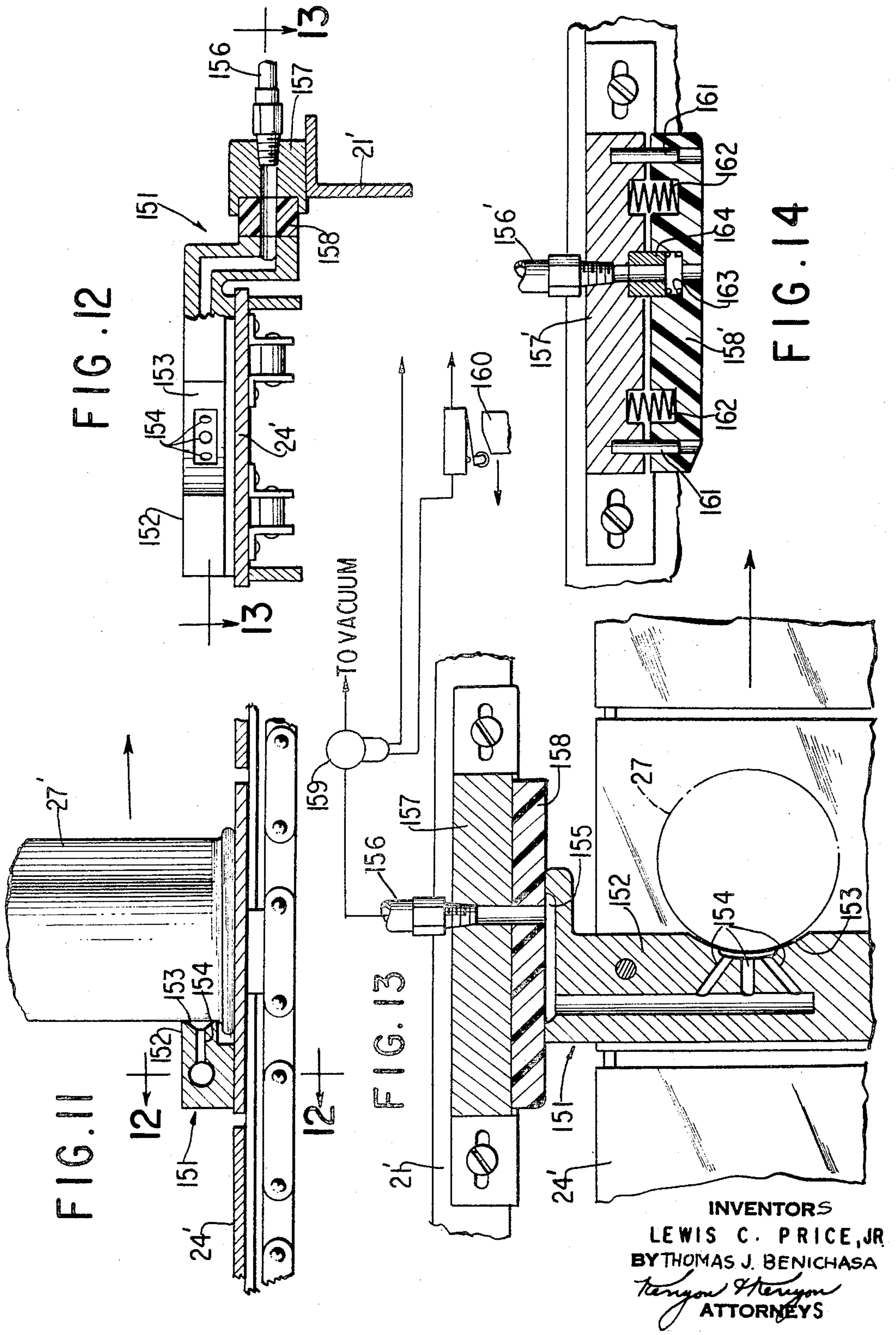
FIG. 11 illustrates a fragmentary cross-sectional view of another modification of the can holding means using vacuum pressure.
FIG. 12 illustrates a view taken on line 12—12 of FIG. 11.
FIG. 13 illustrates a view taken on line 13—13 of FIG. 12.
FIG. 14 illustrates a blown-up modified view of a pneumatic connection of a vacuum source.

Each holding means 151 is formed of a head 152 mounted on the conveyor at a can position which has an arcuate recess 153 for reception of a can 27′ and a plurality of ports 154 communicating the recess 153 with a manifold 155 in the side of the head 152 (FIG. 13). The head 152 cooperates with a vacuum line 156 mounted alongside the conveyor 24′ through an apertured mounting block 157 and an apertured slide block 158 secured in the mounting block 157. The manifold 155 in the head 152 is dimensioned so that shortly after the head comes into sliding contact with the side block 158 the vacuum line 156 communicates with the manifold 155 to create a suction force on the can 27′. The force is maintained until the manifold passes over the vacuum line 156. Thereafter, the head 152 passes to the vacuum line (not shown) in the next position along the conveyor 24′. The manifolds of the heads are so dimensioned and the vacuum lines are so spaced that the suction force holding the cans on the conveyor is only momentarily released during passage of the cans from one position to the next along the conveyor path.

Each vacuum line 156 at the orientating and printing stations has a suitable solenoid valve 159 which is actuated through a microswitch 160 connected in the circuitry of the scanner device for cutting off the vacuum in the line 156 when a can is in the orientating and printing positions. This allows the cans to be rotated without any suction being created to hold the cans to the heads 152.

Referring to FIG. 14, the slide block 158′ may be slidably mounted in the mounting block 157′ to permit a resilient slide fit between a head and the slide block to prevent leakage. In this case, a pair of pins 161 are secured in the mounting block 157′ and the slide block 158′ is slid over the pins 161. In addition, a pair of springs 162 are mounted in opposed recesses of each block 157′, 158′ to urge the blocks slightly apart. A similar spring 163 is positioned in the slide block to urge an apertured block 164 against the vacuum line 156′ to prevent leakage between the blocks 157′, 158′.

The invention provides a vertical can printer machine which has a high rate of output, for example, 3000 units per hour for can units of about 3 inches or less in diameter. Further, the invention allows each can to be accurately and satisfactorily imprinted with the desired markings while on the packaging line and thereby significantly reduces packaging cost. Also, the invention permits imprinting of designated areas of previously applied labels on cans, thus allowing large and small quantity buyers to stock a limited inventory and imprint only immediate requirements.

Having thus described the invention, it is not intended that it be so limited as changes may be readily made therein without departing from the scope of the invention. Accordingly, it is intended that the subject matter described above and shown in the drawings be interpreted as illustrative and not in a limiting sense.

What is claimed is:

1. An automatic container printer machine comprising a conveyor mechanism for conveying the containers through the machine, orientating means astride said conveyor mechanism for rotating a container into a predetermined pre-position, photo-electric means having a scanning and quiescent state and adapted to sense a mark on the container when in said scanning state, reciprocal means for pushing the container into abutment with said orientating means when said photo-electric means are in a scanning state for rotating a container to a predetermined position, and printing means positioned astride said conveyor downstream of said orientating means for imprinting a pre-positioned container thereat, means for intermittently moving said conveyor and holding means for engaging each of the containers thereon during movement of said conveyor, said holding means including a pair of pivotally mounted permanent magnets having magnetic container surfaces for engaging a rounded container surface and means for limiting pivotal movement of said permanent magnets to adjust to different diameter container surfaces.

2. An automatic container printer as set forth in claim 1 wherein said printing means includes a printing mechanism on one side of said conveyor and a reciprocal back-up cradle on the opposite side of said conveyor for pushing a prepositioned container against said printing mechanism for imprinting thereof, said printing mechanism including an ink fountain containing a supply of ink, a vertically disposed rotatable pump wheel projecting into said ink fountain having a plurality of recesses in a vertical face thereof for picking-up ink upon submergence in the supply of ink, a horizontally disposed rotatable ink transfer roller adjacent said vertical face of said pump wheel of transferring ink from said pump wheel, a horizontally disposed rotatable metering roller adjacent said ink transfer roller for transferring ink therefrom, and a horizontally disposed rotatable print cylinder adjacent said metering roller for receiving a metered supply of ink therefrom for imprinting of a can engaged between said print cylinder and said back-up cradle upon rotation of said print cylinder.

3. An automatic container printer as set forth in claim 2 wherein said recesses in said pump wheel are circumferentially spaced.

4. An automatic container printer as set forth in claim 2 wherein said recesses are horizontally disposed in equi-spaced relation.

5. An automatic container printer machine for imprinting a series of random-fed rounded containers having respective registration marks thereon comprising a conveyor for intermittently moving the series of containers on one side of said conveyor, a first reciprocal means for pushing one container of the series into abutment with said wheel upon stopping of said conveyor for rotation with said wheel into a predetermined preposition, and means for reciprocating said first reciprocal means, and printing means downstream of said orientating means having a printing mechanism including a rotatable print cylinder on one side of said conveyor and a second reciprocal means for pushing a pre-positioned second can of the series into abutment with said print cylinder upon stopping of said conveyor for rotation with said print cylinder for imprinting thereof, wherein said means for reciprocating said first reciprocal means includes an air cylinder having a reciprocal piston therein connected to said first reciprocal means, a spring urging said piston away from said first reciprocal means and an air line conducting air into said cylinder in opposition to said spring for urging said piston toward said first reciprocal means; and a photoelectric means operatively connected to said air line for detecting the registration mark of a container in rotating engagement with said wheel and for closing said air line upon energization thereof; opening said air line upon de-energization thereof in response to detection of a registration mark, and which further comprises a drive shaft connected to said conveyor, said wheel and said print cylinder for rotating said wheel and print cylinder in synchronism with said conveyor, and circuit means operatively connected between said drive shaft and said photoelectric means for energizing said photoelectric means upon positioning of a container between said wheel and first reciprocal means whereby said photoelectric means simultaneously scans the container to detect the registration mark thereon and opens said air line to release said first reciprocal means against the container, and wherein said circuit means includes a means on said drive shaft for de-energizing said photoelectric means whereby said photoelectric means is de-energized to open said air line prior to movement of a container into position between said first reciprocal means and said wheel.

6. An automatic can printer as set forth in claim 5 wherein said drive shaft has a pair of cams thereon in synchronized positions with respect to said conveyor, one of said cams being positioned to energize said circuit means and the other of said cams being positioned to de-energize said circuit means in the event a container is missing.

References Cited

UNITED STATES PATENTS

| | | | |
|---|---|---|---|
| 2,630,756 | 3/1953 | Crabtree et al. | 101—378 |
| 2,635,532 | 4/1953 | Stewart | 101—40 |
| 2,718,847 | 9/1955 | Jackson et al. | 101—40 |
| 2,955,532 | 10/1960 | Norlin. | |
| 3,024,722 | 3/1962 | Jamison et al. | 101—40 |
| 3,052,340 | 9/1962 | Lyons et al. | 198—41 |
| 3,086,458 | 4/1963 | Shafer. | |
| 3,253,538 | 5/1966 | Rudolph et al. | 101—40 |
| 3,274,927 | 9/1966 | Lusher et al. | 101—40 |

ROBERT E. PULFREY, *Primary Examiner.*

C. D. CROWDER, *Assistant Examiner.*